United States Patent [19]
Maso

[11] Patent Number: 5,152,634
[45] Date of Patent: Oct. 6, 1992

[54] SEEPING IRRIGATION HOSEPIPE

[75] Inventor: José M. Maso, Barcelona, Spain

[73] Assignee: Texbor S.A., Andorra Saint Julia de Loria, Andorra

[21] Appl. No.: 712,134

[22] Filed: Jun. 6, 1991

[30] Foreign Application Priority Data

Jun. 11, 1990 [ES] Spain ................... 9001612

[51] Int. Cl.⁵ ............................. E02B 13/00
[52] U.S. Cl. ..................... 405/45; 47/48.5; 405/43
[58] Field of Search ............ 405/43, 44, 45, 47, 405/48, 49; 47/48.5; 239/145, 542

[56] References Cited

U.S. PATENT DOCUMENTS

| | | | |
|---|---|---|---|
| 4,235,561 | 11/1980 | Peterson | 405/45 |
| 4,577,998 | 3/1986 | Dorrn | 405/45 |
| 4,616,055 | 10/1986 | Mason | 405/45 X |

FOREIGN PATENT DOCUMENTS

| | | | |
|---|---|---|---|
| 2278847 | 2/1976 | France | 405/45 |
| 703595 | 2/1954 | United Kingdom | 405/45 |
| 1210158 | 10/1970 | United Kingdom | 405/45 |

Primary Examiner—David H. Corbin
Attorney, Agent, or Firm—Michael J. Striker

[57] ABSTRACT

The seeping irrigation hosepipe has an integral textile tube core (1) and a porous material (2) covering the integral textile tube core (1). The textile tube core (1) is resistant to action of organic and inorganic agents, to moisture and to temperature variations. The porous material includes a mixture of resin, plasticizer, colloidal diamond black, bactericides, fungicides, algicides and thickeners and has a water absorption capacity of from 0.5% to 50% by weight of the mixture. The weight ratio of the textile tube core (1) to the porous material is from 5/1 to 1/5. This irrigation hosepipe has the required flexibility and a high tensile and breaking strength against pressure of the irrigation liquid, which allows it to be installed on the surface or buried underground.

7 Claims, 2 Drawing Sheets ns;

SEEPING IRRIGATION HOSEPIPE

FIELD OF THE INVENTION

The present invention relates to a seeping irrigation hosepipe which is applicable, in particular, to seeping irrigation systems, either surface laid or buried, for agricultural crops of any nature. Other applications of the pipe are as follows: distribution of air and other gases in water, in the soil and in the air.

BACKGROUND OF THE INVENTION

Currently, the irrigation of crops of any nature and irrespective of the location thereof, i.e. in the open air or inside special constructions therefor, by irrigation systems based on the seeping effect of certain types of pipe or conduit available on the market is widely used.

Such pipes or conduits are used for the distribution of the irrigation liquid which, as is known, is formed by water plus the dissolved fertilizers and/or chemicals associated with the irrigation process. Unlike other irrigation systems, such as flooding or sprinkler irrigation, the use of seeping pipes or conduits provides as essential advantages greater uniformity in the distribution of the volume of irrigation liquid and, for like performances, a much smaller volume of such liquid is required, which consequently brings with it a reduction of the overall irrigation process costs.

The seeping pipes and conduits may be laid on the ground surface or buried. The operation and installation variables of such seeping pipes or conduits are adapted to the features required by each particular application, with regard to the flowrate of irrigation liquid supplied and the depth of installation.

The seeping pipes or conduits currently available for use in irrigation systems may be classified, generally speaking, by their constituent nature, as follows:

(a) hosepipes formed by a mixture of granulated rubber and low density polythene resins, which pipes are prepared by extruding both said constituent components;

(b) hosepipes of laminated structure prepared by overlaying two or more adhered layers, which are formed by polythene fiber material.

Both said types of hosepipe (a) and (b) suffer from the following drawbacks, either individually or jointly:

to get the irrigation liquid to seep in the majority of normal operating circumstances, it must flow through the said seeping hosepipes turbulently, all of which implies a substantial reduction of the performance of the irrigation system used, particularly with reference to the length of said seeping hosepipes;

a limited tensile and mechanical impact strength, whereby, in view of the regular working conditions to which the seeping hosepipes are subjected, they are frequently broken or torn, thereby generating high maintenance costs;

low mechanical flexibility restricting or preventing their adaptation to the land to be irrigated, making the assembly operations more difficult and thereby increasing the installation costs;

a low resistance to the environmental agents such as fertilizers, roots, bacteria, etc., whereby their working life is relatively short, involving the need to replace the seeping tubes of the irrigation system relatively frequently;

and, in view of their aforesaid low mechanical flexibility, they occupy a large storage space.

SUMMARY OF THE INVENTION

With a view to providing a new embodiment of seeping hosepipe which solves the above described problems, namely in synthesis:

the high pressure and, consequently, turbulent flow of the irrigation liquid;

a limited tensile and mechanical impact strength;

low mechanical flexibility and adaptation to the uneven terrain;

low resistance to the destructive action of environmental agents and, consequently, speedy aging;

and a large storage space;

a seeping irrigation hosepipe having a new constitution and structure is disclosed.

The seeping irrigation hosepipe of the invention is characterised in that it is formed by an integral core of textile tube very resistant to the action of organic and inorganic agents, to damp and to temperature variations, which integral textile tube core is covered by a porous material comprising a mixture of:

resin
plasticiser
pigment
bactericides
fungicides
algicides
thickeners and which has a water absorption capacity ranging from 0.5% to 50% of the weight of the mixture, the weight ratio of the textile tube to the porous material ranging from 5/1 to 1/5, the normal mean value being 2/1.

A further feature of the seeping irrigation hosepipe of the invention is that the integral textile tube core is formed according to any weaving process.

Said integral core is prepared from synthetic fibers such as polyesters, polyamides, polyolefins or acrylics.

The resin component of the porous material covering the said textile tube is highly resistant to aging by water, air, sunlight, by the components of the terrains and by the chemical and/or natural fertilizer products and soil treatments.

Furthermore the plasticiser component of the porous material consists of a sparely water-soluble, non-corrosive, high boiling mixture of chlorine and phosporous.

The structure and constituent members characterising the seeping hosepipe of the invention allow the seeping of the irrigation liquid through the walls of the pipe to operate at very low working or flow pressures of said irrigation liquid.

To be precise, this seeping hosepipe of new structure and composition is operative from a working pressure of 20 kPa, a pressure very much lower that the 80 kPa pressure, approximately, required by known embodiments to start the seeping process.

Under normal conditions of use, the seeping hosepipe of the invention provides the irrigation liquid flowrates which are given in terms of the specific features of each crop at a working pressure ranging from 30 kPa to 80 kPa. This pressure range is, again, very much lower than the operating pressure of 120 kPa which, under equal conditions having regard to flowrate of irrigation liquid supplied, is required by the majority of known seeping pipe embodiments. However, with the pipe of the invention, it is possible to work at larger pressures, such as for example between 100 kPa and 1000 kPa, for the purpose of obtaining larger flowrates, with the guarantee of a complete, normal strength.

In view of the low working pressure from which the seeping hosepipe of the invention is operative, the head losses derived from the flow of the irrigation liquid through said hosepipe are substantially lower relative to the said known embodiments.

The advantage described above, derived from the low pressure at which the irrigation liquid may be made to flow, logically involves a notable reduction of the working pressure required at the origin of the installation, with the consequent reduction of scope of the irrigation liquid pumping and regulation means.

The fact that the seeping hosepipe of the invention is operative at low working pressures, as from 20 kPa as stated above, allows the irrigation liquid to flow through the pipe in laminar flow of in transition flow, unlike the majority of known embodiments where the usual operating conditions for carrying out the irrigation liquid seepage result in the liquid flow being turbulent. Turbulent liquid flow is known to cause substantial limitations with regard to the conduit performance. In fact, the turbulent irrigation liquid flow requires, for a like amount of seeped flowrate, short irrigation lines relative to the diameter used.

Table 1 given below summarises the lengths attainable by the irrigation lines when using the seeping pipe of the invention, working in all cases with laminar or transitional, i.e. between laminar and turbulent, flow.

TABLE 1

| Diameter (mm) | Length (m) |
|---|---|
| 10 | 100 |
| 12 | 140 |
| 17 | 240 |

Where:
Diameter is the inside diameter of the conduit.
Length is the length of the irrigation line.

Another advantage derived from the innovative structure and constitution of the seeping irrigation pipe of the invention is its high breaking strength, either caused by the irrigation liquid pressure or by mechanical traction.

It should be highlighted n this respect that the seeping irrigation pipe of the invention has a resistance to breakage by the internal pressure of the irrigation liquid of up to 500% more than the strength of the known seeping hosepipe embodiments. Also, the tensile breaking strength of the said seeping pipe of the invention is up to 240% higher than that of the known embodiments.

Table 2 gives the results obtained after submitting the seeping pipe of the invention to an aging test conforming to ASTM-C53.

TABLE 2

| Test | New seeping pipe | Pipe after 5 years (1) |
|---|---|---|
| Breaking pressure | 1500 kPa | 1000 kPa |
| Tensile strength | 1950 N | 1250 N |
| Tear strength | 160 N | 100 N |

(1) Equivalent to 1000 hours aging according to ASTM-C53.

The values given in Table 2, which are, as said above, the result of applying the tests according to ASTM-C53 to the seeping irrigation hosepipe of the invention, are conclusive with regard to the capacity of the said hosepipe to withstand aging. In fact, the known seeping hosepipes are totally useless after 5 years aging. also according to ASTM-C53.

A further advantage derived from the structure and constitution of the seeping hosepipe according to the invention consists of its very great mechanical flexibility, allowing it to be adapted perfectly to the irregularities of the ground and/or to the needs of the layout of the irrigation line in each particular application.

The seeping irrigation pipe of the invention may be installed independently on the surface or buried underground. When the seeping pipe of the invention is installed on the surface, the great mechanical flexibility of the said pipe, together with the very high tensile and impact strength thereof allow it to be easily gathered and moved to other crop areas, or be collected for storage and later use.

The tests performed with regard to the resistance to chemical agents of the seeping pipe of the invention show that the pipe perfectly withstands the action of all the chemicals used at normal concentrations in agriculture, outstanding among which, for relatively high frequency of use, are liquid fertilizers, herbicides, pesticides and nitric acid.

Likewise, a further advantage derived from the structure and constitution of the seeping pipe of the invention is its very high resistance to the action of organic agents such as, among others, bacteria, algae, roots, insects, etc.

Under normal conditions, the seeping pipes are stored rooled up on themselves or on a drum. In this respect, the known embodiments suffer from the main drawback that they occupy a large space, due basically to their thickness, their rigidity or lack of flexibility involving large reeling diameters.

Another advantage derived from the structure and constitution of the seeping irrigation hosepipe of the invention is that, as a result of the substantial flexibility thereof, when rolled up on itself or on a drum, it may occupy a minimum space, since the said seeping hosepipe requires a very small winding diameter.

The novel structure of the seeping irrigation hosepipe of the invention allows it to be used with optimum results for the supply of gaseous fluids in liquid fluids, as is required, among other cases, in sea-water cultures where air is required to be supplied to the crop water.

Table 3 shows the results obtained on the capacity of the seeping irrigation hosepipe of the invention to supply gases within liquids, in tests performed to determine the volume of air in water supply by the said seeping hosepipe.

TABLE 3

| Air pressure (kPa) | Pipe length (cms) | Air volume supplied (lit/min) |
|---|---|---|
| 5 | 25 | 1000 |
| 5 | 50 | 1250 |
| 5 | 75 | 1500 |

The very high operativity of the seeping irrigation hosepipe of the invention with regard to the supply of gases in a liquid and, in particular, the supply of air to water, is to be observed from the results given in Table 3. In fact, the 5 kPa air pressure at which the tests were performed is very much lower than the pressure of 1500 kPa which, as stated in Table 2 above, is the breaking pressure of the seeping hosepipe when new, with this broad pressure margin allowing for an appropriate regulation of the air flowrate supplied. depending on the particular needs of each application.

BRIEF DESCRIPTION OF THE DRAWINGS

The seeping irrigation hosepipe of the invention is illustrated in the accompanying sheets of drawings. In said drawings.

DETAILED DESCRIPTION OF THE EMBODIMENT

Figure 1:
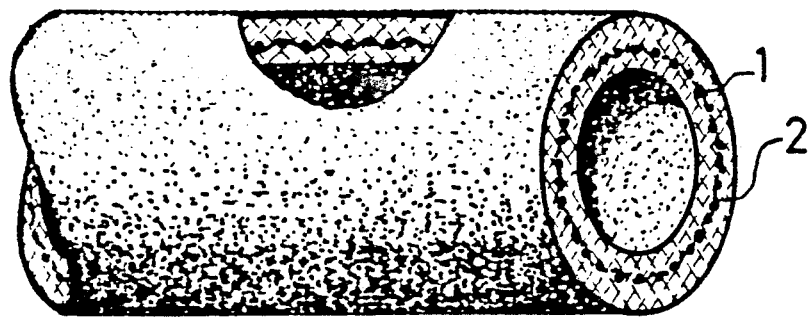
FIG. 1 is a perspective view, partly in section, of the object of the invention.

The seeping irrigation hosepipe of the invention described herein as an embodiment is formed, as shown in FIG. 1 of the drawing sheets, by an integral core 1 and by the porous material covering 2 in which said integral core 1 is totally included.

In this embodiment the integral core 1 is formed by multifilamentary polyester yarns forming precisely a textile tube prepared from warp and weft yarns according to any weaving process.

The porous material covering 2 in which, as stated above, the textile tube forming the integral core 1 is wholly included, is formed by a mixture of appropriate proportions of resin, plasticizer, colloidal diamond black as pigment, bactericides, fungicides, algicides and thickeners.

In this embodiment, the resin forming the covering 2 consists of an anionic self-crosslinking acrylic copolymer having a solids content of approximately 45% and a particle size ranging from 0.1 to 0.3 microns, said resin having an adequate UV radiation resistance.

The plasticizer used in this embodiment is formed mainly by chlorine and phosphorous, the respective wt% of which are 32.46% and 9.43%, is non-corrosive and has a high boiling point rendering it harmless, particularly since descomposition thereof initiates at a temperature in excess of 220° C., very much higher than the normal operating temperatures.

The colloidal diamond black used in this embodiment has a high resistance to UV radiation and alkalis and acids, the solids concentration being about 50%.

The porous material covering 2 described in this embodiment is provided, for protecting the seeping hosepipe of the invention against organic agents, with a highly stable, broad spectrum mixture formed by bactericides, fungicides and algicides, without any mercury or any other metal content.

Figure 2:
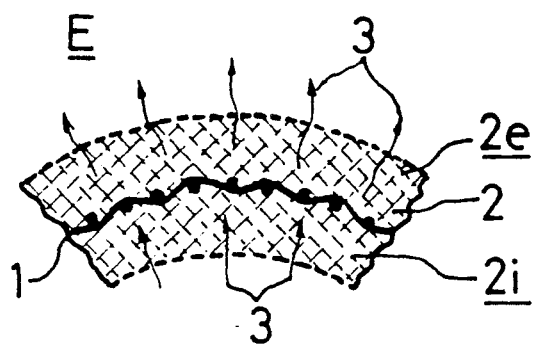
FIG. 2 is a schematic view, partly in section, of the object of the invention.
Figure 3:
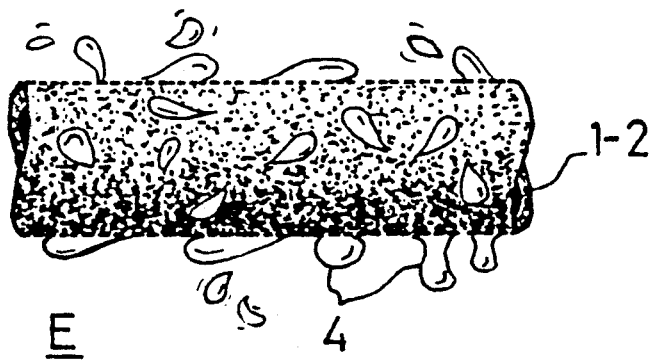
FIG. 3 is a side view, partly in section, of the object of the invention.

In this way, the previously described structure and composition of the seeping hosepipe of the invention allow the irrigation liquid 3, shown in detail in FIGS. 2 and 3 of the drawing sheets, to pass out through the pores, the passage section of which depends on the working, or flow, pressure of the said irrigation liquid 3.

In fact, FIG. 2 shows in detail how the irrigation liquid 3 in the first place passes through the internal thickness 2i of the porous material covering 2 so as, then, to pass through the integral textile tubing core 1 and, finally, on passing through the external thickness 2e of the said covering 2, to reach the external surface E of the seeping hosepipe where it impregnates the surrounding soil in the form of drops 4.

Figure 4:
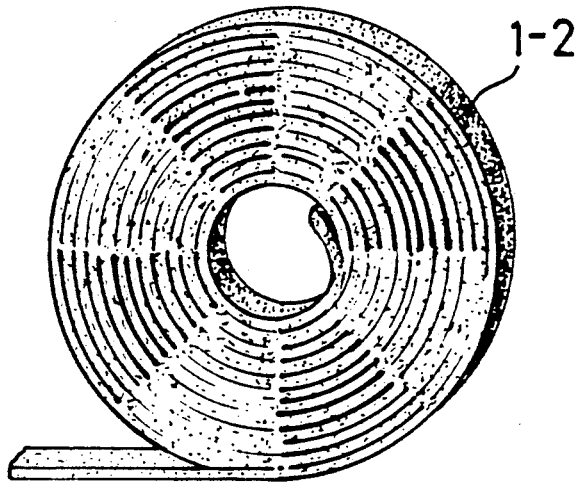
FIG. 4 shows the seeping irrigation hosepipe of the invention in perspective and rolled up.

FIG. 4 shows in detail the high mechanical flexibility obtained by the previously described structure and composition of the seeping irrigation hosepipe according to the invention, which flexibility allows the storage volume occupied to be as small as possible once it is rolled up on itself.

In fact, FIG. 1 shows the cylindrical form taken on by the seeping hosepipe of the invention when irrigation liquid 3 is flowing therethrough at a certain working pressure, which pressure ranges from 30 kPa to 80 kPa. On the other hand, FIG. 4 shows how the said seeping hosepipe, when not subjected to the pressure of the irrigation liquid 3, takes on the oblong form shown in said FIG. 4.

Figure 5:
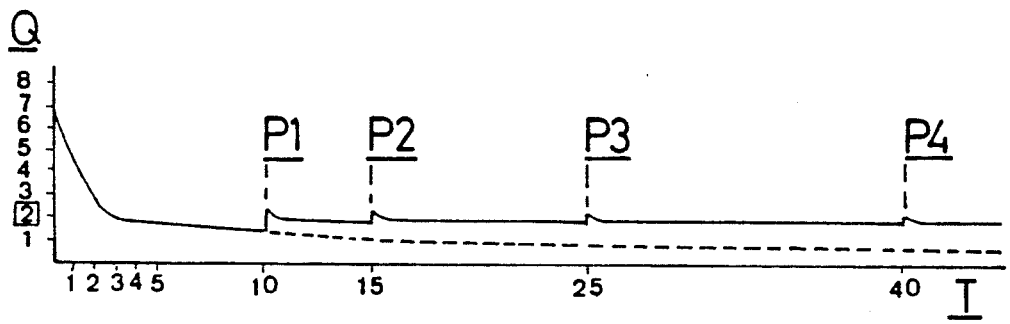
FIGS. 5, 6 and 7 are graphs showing the technical performance of the object of the invention.
Figure 6:
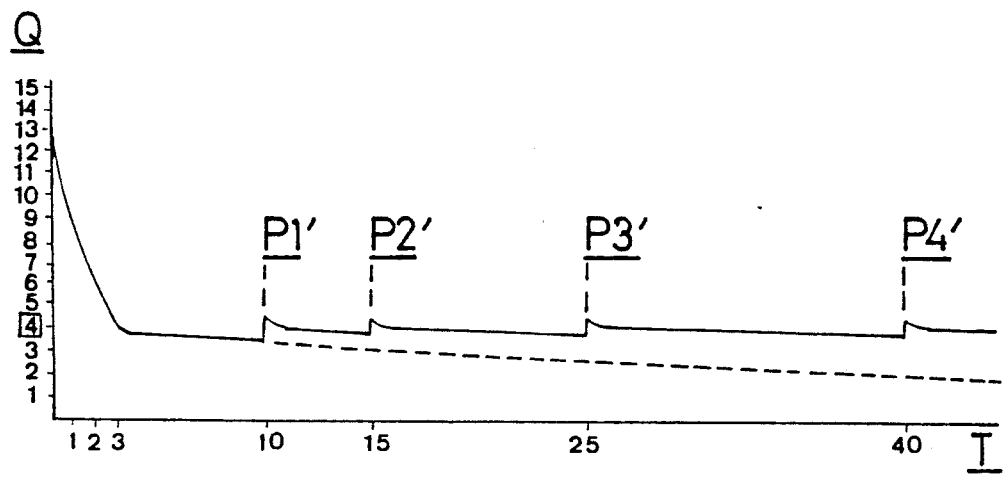
Figure 7:
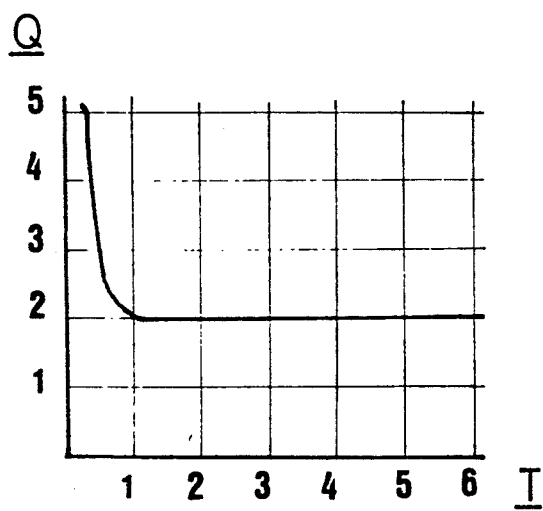

FIGS. 5, 6 and 7 show, by way of corresponding graphic representations, the flowrate of the irrigation liquid seeped by the hosepipe of the invention in terms of the time and certain working pressures.

In FIGS. 5, 6 and 7, the ordinate axis gives the flowrate O of irrigation liquid seeped by the hosepipe in liters/hour, whilst the abscissae give the time in days.

FIG. 5 shows how, for a given initial pressure, the flowrate O of irrigation liquid seeped by the hosepipe of the invention rapidly progressively decreases from an initial value of 7 liters/hour to a value of 2 liters/hour during the first three days in service. In said FIG. 5, the dashed line shows the slow decreasing evolution of the seeped irrigation liquid flowrate O if the initial working or irrigation liquid flow pressure is maintained. So as to hold the flowrate O of seeped irrigation liquid practically constant to the value of 2 liters/hour, as shown in the graph of FIG. 5, the irrigation liquid is pumped at different increasing pressures P1, P2, P3 and P4 in times T shown in said FIG. 5. As relevantly shown in FIG. 5, the time interval lying between the application of consecutive increasing pressures is increasingly longer, depending precisely on the time elapsed, this being due to the notable hysteresis of the seeping hosepipe of the invention.

In a similar way, FIG. 6 shows how, for a given initial pressure, the flowrate O of seeped irrigation liquid rapidly progressively decreases from an initial value of 13 liters/hour to a value of 4 liters/hour, the increasing irrigation liquid pumping pressures P1', P2', P3' and P4' being applied with a view to maintaining the irrigation liquid flowrate O constant in times T coinciding with those indicated in FIG. 5. These pressure increases also additionally allow the pores to be cleared of possible impurities which have accumulated during the seepage.

To summarise, theoretically, the behaviour of the seeping hosepipe of the invention is shown schematically in the graph of FIG. 7, which shows the rapid decrease of the seeped irrigation liquid flowrate O occurring during the early hours of operation, to be held practically constant thereafter.

While the invention has been illustrated and described in a seeping irrigation hosepipe, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A seeping irrigation hosepipe, consisting of an integral textile tube core (1) and a porous material (2) covering the integral textile tube core (1), said textile tube core (1) being resistant to action of organic and inorganic agents, to moisture and to temperature variations, said porous material comprising a mixture of resin, plasticizer, pigment, bactericides, fungicides, algicides and thickeners and which has a water absorption capacity of from 0.5% to 50% by weight of the mixture, and a weight ratio of the textile tube core (1) to the porous material is from 5/1 to 1/5.

2. A seeping irrigation hosepipe according to claim 1, wherein the integral textile tube core (1) is formed in a weaving process.

3. A seeping irrigation hosepipe according to claim 1, wherein the integral textile tube core (1) is made from synthetic fiber.

4. A seeping irrigation hosepipe according to claim 3, wherein said synthetic fiber is selected from the group consisting of polyesters, polyamides, polyolefins and acrylics.

5. A seeping irrigation hosepipe according to claim 1, wherein the resin of the porous material (2) is resistant to aging by water, air, sunlight, earth, chemical fertilizer, natural fertilizer and soil treatments.

6. A seeping irrigation hosepipe according to claim 1, wherein the plasticizer consists of a weakly water-soluble, noncorrosive, high-boiling mixture containing chlorine and phosphorous.

7. A seeping irrigation hosepipe, comprising an integral textile tube core (1) and a porous material (2) covering the integral textile tube core (1), said textile tube core (1) being resistant to action of organic and inorganic agents, to moisture and to temperature variations, said porous material comprising a mixture of resin, plasticizer, pigment, bactericides, fungicides, aligicides and thickeners and which has a water absorption capacity of from 0.5% to 50% by weight of the mixture, and a weight ratio of the textile tube core (1) to the porous material is from 5/1 to 1/5, the textile tube core and the porous material being uninterrupted in a longitudinal direction and also in a circumferential direction of the hosepipe, the textile tube core being arranged in the porous material so that an outer layer of the porous material extends from the textile tube core to an outer surface of the hosepipe and an inner layer of the porous material extends from the textile tube core to an inner surface of the hosepipe.

* * * * *